United States Patent [19]

Murata et al.

[11] Patent Number: 5,191,005
[45] Date of Patent: Mar. 2, 1993

[54] PROCESS FOR PREPARING THERMOPLASTIC ELASTOMER COMPOSITIONS AND THERMOPLASTIC ELASTOMER COMPOSITIONS

[75] Inventors: Kazuhiko Murata; Norishige Murakami; Shizuo Shimizu, all of Ichihara, Japan

[73] Assignee: Mitsui Petrochemical Industries, Ltd., Tokyo, Japan

[21] Appl. No.: 613,749

[22] PCT Filed: Jul. 10, 1990

[86] PCT No.: PCT/JP90/00885
§ 371 Date: Dec. 13, 1990
§ 102(e) Date: Dec. 13, 1990

[87] PCT Pub. No.: WO91/00890
PCT Pub. Date: Jan. 24, 1991

[30] Foreign Application Priority Data

Jul. 10, 1989 [JP] Japan .................... 1-177342
Jun. 18, 1990 [JP] Japan .................... 2-159185

[51] Int. Cl.⁵ .................................................. C08K 5/54
[52] U.S. Cl. .................................................. 524/269
[58] Field of Search .......................................... 524/269

[56] References Cited

U.S. PATENT DOCUMENTS 4,247,652 1/1981 Matsuda et al. .............. 521/95

OTHER PUBLICATIONS

PCT WO-A-8 808 015, Exxon Chemical Patents, Inc., 20 Oct. 1988.
WPIL, File Supplier, Accession No. 88-203018 (29), Derwent Publications Ltd., London; JP-A-63 142 032 (Mitsubishi Petrochem, K.K.) Jun. 14, 1988.

Primary Examiner—Paul R. Michl
Assistant Examiner—John J. Guarriello
Attorney, Agent, or Firm—Sherman and Shalloway

[57] ABSTRACT

Thermoplastic elastomer compositions are prepared by feeding a mixture of (a) a peroxide crosslinking type olefin copolymer rubber, (b) a peroxide decomposition type olefin plastics and optionally, (c) a peroxide non-crosslinking type hydrocarbon rubbery substance through a hopper into a cylinder of an extrusion machine, and feeding simultaneously (d) a mineral oil type softener, or both (d) and (e) silicone oil, through an inlet provided on the cylinder separately from the hopper, thereby dynamically heat treating the resulting mixture in the presence of organic peroxide to prepare a partially crosslinked thermoplastic elastomer composition. Alternatively the mixture of the above-mentioned components (a) and (b), or (a), (b) and (c) are fed through a hopper into a cylinder of an extrusion machine so that the retention time of the mixture in the hopper is within 10 minutes, and feeding simultaneously (d) mineral oil type softener, or both (d) and (e) silicone oil into the hopper, thereby dynamically heat treating the resulting mixture in the presence of organic peroxide to prepare a partially crosslinked thermoplastic elastomer composition.

20 Claims, No Drawings ized in that said compositions are obtained by dynamically heat treating in the presence of organic peroxide a mixture comprising (a) 90-40 parts by weight of peroxide crosslinking type olefin copolymer rubber, (b) 10-60 parts by weight of peroxide decomposition type olefin plastics (herein (a) and (b) are selected so that (a)+(b) are 100 parts by weight), and 5-100 parts by weight of (c) peroxide noncrosslinking type hydrocarbon rubbery substance and/or (d) mineral oil type softener. By using the thermoplastic elastomer compositions prepared according to the process disclosed in this Japanese Pa-

PROCESS FOR PREPARING THERMOPLASTIC ELASTOMER COMPOSITIONS AND THERMOPLASTIC ELASTOMER COMPOSITIONS

FIELD OF INVENTION

This invention relates to processes for preparing thermoplastic elastomer compositions and to thermoplastic elastomer compositions and more particularly to processes for preparing thermoplastic elastomer compositions capable of providing molded articles of thermoplastic elastomer low in hardness and excellent in soft touch, feelingness and cushioning characteristics, and to such thermoplastic elastomer compositions.

BACKGROUND OF THE INVENTION

Heretofore, thermoplastic elastomers have been widely used as materials for bumper parts, automotive interior trims such as instrument panels and interior sheets, or golf club grips or swimming fins. The thermoplastic elastomers referred to above have characteristics of both thermoplasticity and elasticity, and are capable of being formed by injection or extrusion molding technique or the like into molded articles which are excellent in heat resistance, tensile characteristics, weatherability, flexibility and elasticity.

For example, Japanese Patent Publn. No. 34210/1978 discloses thermoplastic elastomers prepared by partially curing a composition containing 60-80 parts by weight of monoolefin copolymer rubber and 40-20 parts by weight of polyolefin plastics under dynamic conditions. Japanese Patent Publn. No. 21021/1978 discloses thermoplastic elastomers which (a) a partially crosslinked copolymer rubber comprising an ethylene/propylene/-nonconjugated polyene copolymer rubber and having a gel content of 30-90% by weight, and (b) a polyolefin resin. Further, Japanese Patent Publn. No. 18448/1980 discloses thermoplastic elastomers obtained by partially or completely crosslinking a composition containing ethylene/propylene copolymer rubber and a polyolefin resin under dynamic conditions.

Such thermoplastic elastomer compositions as cited above may be formed by an injection or extrusion molding technique or the like into molded articles excellent in heat resistance, tensile strength, weatherability, flexibility and elasticity. However, these thermoplastic elastomer compositions had such drawbacks that they are markedly poor in molding workability and flow characteristics, with the result that flow marks are formed on the surface of the resulting molded articles and the molded articles obtained deteriorate in external appearance.

With the view of solving such drawbacks as mentioned above, the present applicant disclosed by way of Japanese Patent Publn. No. 15741/1981 partially crosslinked thermoplastic elastomer compositions charactertent Publn. No. 15741/1981, however, no molded articles having JIS A type spring hardness (JIS K-6301) of not more than 50 were obtained.

Recently, however, composite materials for use in automotive trim materials, which are prepared by a two-color injection molding technique using, for example, a filler-incorporated polypropylene as a core and a thermoplastic elastomer as a surface material, are required to meet such requirements that the filler-incorporated polypropylene is to impart mechanical strength to said composite materials and the surface material composed of the thermoplastic elastomer is to impart low hardness, excellent soft touch, feelingness and cushioning properties to said composite materials. Under such circumstances, there has come to be desired the advent of such thermoplastic elastomer compositions as capable of providing therefrom molded articles having JIS A spring hardness of not more than 50 and excellent in soft touch, feelingness and cushioning properties.

In the present invention, it is an object of the invention to provide processes for preparing thermoplastic elastomer compositions from which molded articles low in hardness and excellent in soft touch, feelingness and cushioning properties are obtained and also to provide such thermoplastic elastomer compositions.

DISCLOSURE OF THE INVENTION

The first process for preparing the thermoplastic elastomer compositions of the present invention is characterized in that a mixture comprising (a) 90-40 parts by weight of peroxide crosslinking type olefin copolymer rubber,
 (b) 10-60 parts by weight of peroxide decomposition type olefin plastics (wherein (a) and (b) are selected so that (a)+(b) are 100 parts by weight), and
 (c) 0-100 parts by weight of peroxide noncrosslinking type hydrocarbon rubbery substance is fed through a hopper into a cylinder of an extruding machine and, at the same time,
 (d) a mineral oil type softener, or (d) a mineral oil type softener and (e) silicone oil are fed through an inlet separately provided on the cylinder into said cylinder, wherein the resulting mixture is dynamically heat treated in the presence of organic peroxide to prepare partially crosslinked thermoplastic elastomer compositions.

The first thermoplastic elastomer compositions are partially crosslinked thermoplastic elastomer compositions obtained by feeding through a hopper into a cylinder of an extruding machine a mixture comprising (a) 90-40 parts by weight of peroxide crosslinking type olefin copolymer rubber,
 (b) 10-60 parts by weight of peroxide decomposition type olefin plastics (wherein (a) and (b) are selected so that (a)+(b) are 100 parts by weight), and
 (c) 0-100 parts by weight of peroxide noncrosslinking type hydrocarbon rubbery substance, feeding simultaneously (d) a mineral oil type softener, or (d) a mineral oil type softener and (e) silicone oil through an inlet separately provided on said cylinder into the cylinder, and dynamically heat treating the resulting mixture in the presence of organic peroxide.

The second process for preparing the thermoplastic elastomer compositions of the present invention is characterized in that a mixture comprising (a) 90-40 parts by weight of peroxide crosslinking type olefin copolymer rubber, (b) 10-60 parts by weight of peroxide decomposition type olefin plastics (wherein (a) and (b) are selected so that (a)+(b) becomes 100 parts by weight), and (c) 0-100 parts by weight of peroxide noncrosslinking type hydrocarbon rubbery substance is fed through a hopper into a cylinder of an extrusion machine under such conditions that the retention time in the hopper of the mixture is within 10 minutes and, at the same time, (d) a mineral oil type softener, or (d) a mineral oil type softener and (e) silicone oil are fed into said hopper, wherein the resulting mixture is dynamically heat treated in the presence of organic peroxide to prepare partially crosslinked thermoplastic elastomer compositions.

The second thermoplastic elastomer compositions of the invention are partially crosslinked thermoplastic compositions obtained by feeding through a hopper into a cylinder of an extrusion machine under such conditions that the retention time in the hopper of the mixture is within 10 minutes a mixture comprising (a) 90-40 parts by weight of peroxide crosslinking type olefin copolymer rubber, (b) 10-60 parts by weight of peroxide decomposition type olefin plastics (wherein (a) and (b) are selected so that (a)+(b) becomes 100 parts by weight), and (c) 0-100 parts by weight peroxide noncrosslinking type hydrocarbon rubbery substance, feeding simultaneously (d) a mineral oil type softener, or (d) a mineral oil type softener and (e) silicone oil to said hopper, and dynamically heat treating the resulting mixture in the presence of organic peroxide.

BEST MODE FOR PREPARING THE INVENTION

The processes for preparing the partially crosslinked thermoplastic elastomer compositions of the present invention and the thermoplastic elastomer compositions of the invention are illustrated below in detail.

In the invention, (a) peroxide crosslinking type olefin copolymer rubber, (b) peroxide decomposition type olefin plastics, (d) a mineral oil type softener, (c) peroxide non-crosslinking type hydrocarbon rubbery substance, and (e) silicone oil are used.

(a) Peroxide Crosslinking Type Olefin Copolymer Rubber

By peroxide crosslinking type olefin copolymer rubber as used in the invention is meant such an amorphous elastic copolymer which comprises olefin, for example, as ethylene/propylene copolymer rubber, ethylene/propylene/non-conjugated diene rubber or ethylene/butadiene copolymer rubber, including copolymer rubber oil-extended with a mineral oil type softener known generally as oil-extended rubber, and which decreases in flowability or does not flow by crosslinking when mixed with organic peroxide and kneaded under application of heat. In this connection, by non-conjugated diene as referred to above is meant dicyclopentadiene, 1,4-hexadiene, dicyclooctadiene, methylenenorbornene or ethylidenenorbornene.

Of these copolymer rubbers as illustrated above, preferably useful in the invention are ethylene/propylene copolymer rubber and ethylene/propylene/non-conjugated diene rubber, including generally those in which the ethylene repeating unit/propylene repeating unit molar ratio (ethylene/propylene) is from 50/50 to 90/10, particularly those in which said molar ratio is from 55/45 to 85/15. Above all, ethylene/propylene/non-conjugated diene copolymer rubber, especially ethylene/propylene/5-ethylidene-2-norbornene copolymer rubber and ethylene/propylene/5-ethylidene-2-norbornene/dicyclopentadiene quaternary polymer are particularly preferred from a practical standpoint that they give a thermoplastic elastomer composition excellent in heat resistance, tensile characteristics and impact resilience.

The above-mentioned copolymer rubbers have a Mooney viscosity [$ML_1+4$ (100° C.)] of 10-250, preferably 40-150. By using the copolymer rubbers having the Mooney viscosity as defined above, thermoplastic elastomer compositions excellent in tensile characteristics and flowability are obtained.

These copolymer rubbers mentioned above desirably have an iodine value (degree of unsaturation) of not more than 25. By using the copolymer rubbers having the iodine value as defined above, thermoplastic elastomer compositions well balanced between flowability and rubber-like characteristics are obtained.

In the present invention, the peroxide crosslinking type olefin copolymer rubber (a) is used in an amount of 90-40 parts by weight, preferably 80-50 parts by weight based on 100 parts by weight of the total sum of the peroxide crosslinking type olefin copolymer rubber (a) and peroxide decomposition type olefin plastics (b). By using the peroxide crosslinking type olefin copolymer rubber (a) in such an amount as defined above, thermoplastic elastomer compositions excellent in heat resistance, flowability, flexibility and impact resilience are obtained.

(b) Peroxide Decomposition Type Olefin Plastics

By peroxide decomposition type olefin plastics used in the invention are meant olefin plastics which decrease in molecular weight and increase in flowability when they are thermally decomposed by mixing with peroxide, followed by kneading under application of heat. Such olefin plastics as having the above-mentioned properties include, for example, isotactic polypropylene, or copolymers of propylene and small amounts of other α-olefins such as propylene/ethylene copolymers, propylene/1-butene copolymers, propylene/1-hexene copolymers, and propylene/4-methyl-1-pentene copolymers. The peroxide decomposition type olefin plastics used in the mixing as illustrated above desirably have a melt index (ASTM-D-1238-65T, 230° C.) of preferably 0.1-50, particularly preferably 5-20. In the invention, the peroxide decomposition type olefin plastics contribute to improvement in flowability as well as in heat resistance of the resulting composition.

The peroxide decomposition type olefin plastics (b) are used in an amount of 10-60 parts by weight, preferably 20-50 parts by weight based on 100 parts by weight of the total sum of the peroxide crosslinking type olefin copolymer rubber (a) and peroxide decomposition type olefin plastics (b). By using the peroxide decomposition type olefin plastics (b) in the amount as defined above, thermoplastic elastomer compositions excellent in heat resistance, flowability, flexibility and impact resilience are obtained.

(c) Peroxide Non-crosslinking Type Hydrocarbon Rubbery Substance

By a peroxide non-crosslinking type hydrocarbon rubbery substance used in the invention is meant a hydrocarbon rubbery substance which does not crosslink and does not decrease in flowability even when mixed with peroxide followed by kneading under application of heat, for example, polyisobutylene, butyl rubber (IIR), propylene/ethylene copolymer rubber containing not less than 70 mol% of propylene and atactic polypropylene. Above all, the most preferable ones are polyisobutylene and butyl rubber (IIR) from the standpoint of performance and handling.

The peroxide non-crosslinking type hydrocarbon rubbery substance is used for improving flowability of the thermoelastic elastomer compositions, and the one having a Mooney viscosity of not greater than 60 is preferable.

The peroxide non-crosslinking type hydrocarbon rubbery substance (c) is used in the invention in an amount of 0–100 parts by weight, preferably 10–50 parts by weight and especially preferably 15–40 parts by weight based on 100 parts by weight of the total sum of the peroxide crosslinking type olefin copolymer rubber (a) and peroxide decomposition type olefin plastics (b).

(d) Mineral Oil Type Softener

Mineral oil type softeners used in the invention are high boiling petroleum fractions which are usually used for the purposes of weakening intermolecular action of rubber to facilitate the processing of the rubber at the time when the rubber is roll milled and, at the same time, of helping dispersion into rubber of carbon black, white carbon or the like to be incorporated as a filler, or of decreasing the vulcanized rubber in hardness to improve its flexibility and resilience. These petroleum fractions are classified into paraffinic, naphthenic and aromatic softeners.

In the present invention, the naphthenic mineral oil type softeners are used in preference to the paraffinic mineral oil type softeners, because molded articles obtained from thermoplastic elastomer compositions containing the former softeners are less in stickiness (tackiness) to the touch of the molded article surface in comparison with those obtained from thermoplastic elastomer compositions containing the latter softeners.

In the present invention, the mineral oil type softener (d) is used in an amount of 5–100 parts by weight, preferably 10–80 parts by weight and especially preferably 20–70 parts by weight based on 100 parts by weight of the total sum of the peroxide crosslinking type olefin copolymer rubber (a) and peroxide decomposition type olefin plastics (b).

The mineral oil type softener (d) may also be incorporated into a blend of the aforementioned (a) and (b) or of the aforementioned (a), (b) and (c) in such small amount that no hindrances are thrown in the way of accomplishing the object of the invention.

(e) Silicone Oil

Examples of silicone oil which is used, if necessary, in the invention include dimethyl silicone oil, phenylmethyl silicone oil, fluorosilicone oil, tetramethyltetraphenyl trisiloxane and modified silicone oil. Of these silicone oils, preferably used are dimethyl silicone oil and phenylmethyl silicone oil.

The silicone oil (e) is used in the invention in an amount of 1–40 parts by weight, preferably 2–30 parts by weight and especial parts by weight based on 100 parts by weight of the total sum of the peroxide crosslinking type olefin copolymer rubber (a) and peroxide decomposition type olefin plastics (b).

The silicone oil (e) may also be incorporated singly or in combination with the aforementioned mineral oil type softener (d) into a blend of the aforementioned (a) and (b) or of the aforementioned (a), (b) and (c) in such small amounts that no hindrances are thrown in the way of accomplishing the object of the invention.

In the molded articles obtained from thermoplastic elastomer compositions incorporated with the above-mentioned mineral oil type softener (d) and silicone oil (e), the molded article surface is free from stickiness (tackiness), and dry and smooth touch is obtained. In the molded articles obtained from thermoplastic elastomer compositions containing the mineral oil type softener (d) but containing no silicon oil (e), stickiness (tackiness) remains on the molded article surface unavoidably. Accordingly, it is desirable in the invention to use the mineral oil type softener (d) in combination with the silicone oil (e).

The first thermoplastic elastomer compositions of the invention are prepared by the first process for preparing thermoplastic elastomer compositions of the invention, and the second thermoplastic elastomer compositions of the invention are prepared by the second process for preparing thermoplastic elastomer compositions of the invention.

First, the first process for preparing thermoplastic elastomer compositions of the invention and the first thermoplastic elastomer compositions of the invention are illustrated hereinafter.

In the first process for preparing thermoplastic elastomer compositions of the invention, there is used, as the mixture to be fed into a hopper of the extrusion machine used therefor, a mixture containing 90–40 parts by weight of the aforesaid peroxide crosslinking type olefin copolymer rubber (a), 10–60 parts by weight of peroxide decomposition type olefin plastics (b) and 0–100 parts by weight of peroxide non-crosslinking type hydrocarbon rubbery substance (c), or a mixture containing 90–40 parts by weight of the peroxide crosslinking type olefin copolymer rubber (a), 10–60 parts by weight of peroxide decomposition type olefin plastics (b), 1–100 parts by weight of peroxide non-crosslinking type hydrocarbon rubbery substance and a small amount of the mineral oil type softener (d) and/or a small amount of silicone oil (e).

The first thermoplastic elastomer compositions of the invention may be obtained by feeding the above-mentioned mixture through a hopper into a cylinder of the extrusion machine, feeding simultaneously the mineral oil type softener (d), or the mineral oil type softener (d) and silicone oil (e) through an inlet provided separately on the cylinder into said cylinder, preferably into the portion of said cylinder at which said mixture is in a molten state and especially preferably into a metering section of said cylinder, and dynamically heat treating the resulting mixture in the presence of organic peroxide to partially crosslink the mixture.

The above-mentioned inlet to be provided separately on the cylinder of the extrusion machine may be provided in the vicinity of the hopper. The shape of this inlet may be a pipe (tubular) form or hopper form, but the inlet of the pipe form is preferred from the standpoint of process control.

When thermoplastic elastomer compositions low in hardness are intended to obtain by conventional processes for preparing thermoplastic elastomer compositions, it becomes necessary to use a blend of the peroxide crosslinking type olefin copolymer rubber, peroxide decomposition type olefin plastics and peroxide non-crosslinking type hydrocarbon rubbery substance, to which large amounts of the mineral oil type softener have been added. In such conventional processes as illustrated above, however, it was practically not possible to prepare thermoplastic elastomer compositions having a JIS A type spring hardness of not more than 50, because it was difficult to feed the mixture into the extrusion machine in view of the fact that said mixture promptly increases in tackiness and becomes sticky.

In the present invention, it has become possible to prepare thermoplastic elastomer compositions capable of providing therefrom molded articles which are low in hardness and excellent in soft touch, feelingness and cushioning properties by virtue of adopting, as mentioned previously, the process which comprises feeding the mineral oil type softener (d), or the mineral oil type softener (d) and silicone oil (e) into the cylinder of the extrusion machine separately from the feeding into said cylinder of the mixture containing at least the aforementioned components (a) and (b).

In the invention, so long as no hindrances are thrown in the way of accomplishing the object of the invention, various additives may be incorporated into the thermoplastic elastomer composition, such as fibrous fillers, polyolefin plastics, or fillers, for example, glass fibers, potassium titanate fibers, high density polyethylene, medium-density polyethylene, low density polyethylene, isotactic polypropylene, propylene/α-olefin copolymer, calcium carbonate, calcium silicate, clay, kaolin, talc, silica, diatomaceous earth, mica powder, asbestos, alumina, barium sulfate, aluminum sulfate, calcium sulfate, basic magnesium carbonate, molybdenum disulfide, graphite, glass fibers, glass beads, silas balloon and carbon fiber, or colorants, for example, carbon black, titanium oxide, zinc white, red iron oxide, ultramarine, Prussian blue, azo dye, nitroso dye, lake and phthalocyanine pigment.

The thermoplastic elastomer compositions of the invention may be incorporated with various additives such as known heat stabilizers of the phenol, sulfite, phenylalkane, phosphite or amine type, aging-resistant agents, weathering stabilizers, antistatic agents, and lubricants such as metallic soap and wax in such amounts as used for olefin type plastics or olefin copolymer rubber.

In the invention, a blend containing the aforementioned components is partially crosslinked by dynamically heat treating the blend in the presence of organic peroxide to prepare a thermoplastic elastomer.

The expression "dynamically heat treating" as used herein is intended to mean that the blend is kneaded in its molten state.

Examples of the organic peroxide used in preparing the thermoplastic elastomers of the invention include dicumyl peroxide, di-tert-butyl peroxide, 2,5-dimethyl-2,5-di-(tert-butylperoxy)hexane, 2,5-dimethyl-2,5-di-(tert-butylperoxy)hexyne-3, 1,3-bis(tert-butylperoxyisopropyl)benzene, 1,1-bis(tert-butylperoxy)-3,3,5-trimethylcyclohexane, n-butyl 4,4-bis(tert-butylperoxy)valerate, benzoyl peroxide, p-chlorobenzoyl peroxide, 2,4-dichlorobenzoyl peroxide, tert-butyl peroxybenzoate, tert-butyl perbenzoate, tert-butylperoxyisopropyl carbonate, diacetyl peroxide, lauroyl peroxide and tert-butylcumyl peroxide.

Of these organic peroxides exemplified above, preferred from the standpoint of odor and scorching stability are 2,5-dimethyl-2,5-di(tert-butylperoxy)hexane, 2,5-dimethyl-2,5-di(tert-butylperoxy)hexyne-3, 1,3-bis(tert-butylperoxyisopropyl)benzene, 1,1-bis(tert-butylperoxy)-3,3,5-trimethylcyclohexane and n-butyl 4,4-bis(tert-butylperoxy)valerate, and 1,3-bis(tert-butylperoxyisopropyl)benzene is most useful.

The organic peroxide is used in the invention in an amount of 0.05-3% by weight, preferably 0.1-1% by weight and especially preferably 0.1-0.5% by weight based on the total sum weight of the aforementioned components (a), (b) and (c). By using the organic peroxide in such an amount as defined above, the resulting thermoplastic elastomer will come to have heat resistance, tensile characteristics, rubber-like properties such as elastic recovery and impact resilience, and strength to a sufficient extent, and also have excellent moldability.

Kneading equipment used in the invention, by means of which the aforementioned blend is kneaded in the presence of the organic peroxide, are extrusion machines. Of these equipment, preferred are closed type equipment, and the kneading operation is carried out preferably in an atmosphere of inert gas such as nitrogen or carbondioxide gas. The kneading operation may be carried out at a temperature where the half-value period of the organic peroxide used becomes less than 1 minute, i.e. usually 150°-280° C., preferably at 170°-240° C. for 1-20 minutes, preferably 1-10 minutes. The shear force to be applied to the abovementioned blend at the time of kneading is usually $10-10^4$ sec$^{-1}$, preferably $10^2-10^3$ sec$^{-1}$ in terms of shear rate.

In the present invention, at the time of partial crosslinking treatment with the above-mentioned organic peroxide, there may be used peroxide crosslinking assistants such as sulfur, p-quinonedioxime, p,p'-dibenzoylquinonedioxime, N-methyl-N-4-dinitrosoaniline, nitrobenzene, diphenylguanidine and trimethylolpropane-N,N'-m-phenylenedimaleimide, or polyfunctional methacrylate monomers such as divinylbenzene, triallylcyanurate, ethylene glycol dimethacrylate, diethylene glycol dimethacrylate, polyethylene glycol dimethacrylate, trimethylolpropane trimethacrylate and allyl methacrylate, and polyfunctional vinyl monomers such as vinyl butyrate and vinyl stearate. By the use of such compounds as illustrated above, a uniform and mild crosslinking reaction can be expected to proceed. Because divinylbenzene is easy to handle, favorably mutually soluble with the aforementioned olefin rubber and olefin plastics which are the main components of the blend to be kneaded, has an action of solubilizing the organic peroxide used, and functions as a dispersant assistant for said organic peroxide, the use of divinylbenzene in the invention is most serviceable to obtain the desired composition having a homogeneous crosslinking effect obtained by heat treatment and well balanced between flowability and physical properties.

The crosslinking assistant or polyfunctional vinyl monomer is used in the invention in an amount of 0.1-2% by weight, preferably 0.3-1% by weight based on the whole of the blend to be kneaded. By using such crosslinking assistant or polyfunctional vinyl monomer as mentioned above in the amount as defined above, there may be obtained the desired composition which is excellent in flowability and which does not bring about change in physical properties caused by heat history at the time when it is molded.

For the purpose of accelerating decomposition of the organic peroxide used, there may also be used decomposition accelerators, for example, tertiary amines such as triethylamine, tributylamine and 2,4,6-tris(dimethylamino)phenol, or naphthenates of metals such as aluminum, cobalt, vanadium, copper, calcium, zirconium, manganese, magnesium, lead and mercury.

As mentioned hereinbefore, the partial crosslinking as referred to in the invention is carried out by dynamical heat treatment in the presence of organic peroxide.

By the expression "the thermoplastic elastomer has been partially crosslinked" as used in the invention is meant that the gel content in the partially crosslinked thermoplastic elastomer as measured by the following procedure is in the range of not less than 20%, preferably 20-99.5% and especially preferably 45-98%.

Determination of Gel Content

A specimen of 100 mg weighed out of the thermoplastic elastomer was cut into pieces of 0.5 mm x 0.5 mm x 0.5 mm in size and the pieces were immersed in 30 ml of cyclohexane at 23° C. for 48 hours in a closed container. The specimen thus immersed was then taken out of the container, placed on a filter paper and dried at room temperature for more than 72 hours until a constant weight is reached.

From the weight of this dried residue, a weight of cyclohexane insolubles (fibrous filler, filler, pigment, etc.) other than the polymer component and a weight of the olefin plastics present in the specimen before its immersion in cyclohexane are deducted to obtain a weight which is taken as [corrected final weight (Y)].

On one hand, the weight of the peroxide crosslinking type olefin copolymer rubber present in the specimen [that is a weight obtained by deducting from the weight of the specimen (1) a weight of cyclohexane solubles (e.g. mineral oil or plasticizer) other than the peroxide crosslinking type olefin copolymer rubber, (2) a weight of the olefin plastics component and (3) a weight of cyclohexane insolubles (fibrous filler, filler, pigment, etc.) other than the polymer component)] is taken as [corrected initial weight (X)].

The gel content of the partially crosslinked thermoplastic elastomer obtained is determined according to the following equation.

$$\text{Gel content (wt. \%)} = \frac{\text{Corrected final weight }(Y)}{\text{Corrected initial weight }(X)} \times 100$$

The second process for preparing thermoplastic elastomer compositions of the invention and the second thermoplastic elastomer compositions of the invention are illustrated hereinafter.

In the second process for preparing thermoplastic elastomer compositions of the invention, the mixture to be fed into a hopper of extrusion machine is the same mixture as used in the first process for preparing thermoplastic elastomer compositions of the invention.

The second thermoplastic elastomer compositions of the invention may be obtained by feeding the above-mentioned mixture through the hopper into a cylinder of said extrusion machine under such conditions that the retention time in the hopper of said mixture is within 10 minutes, feeding simultaneously the aforementioned mineral oil type softener (d), or the aforementioned mineral oil type softener (d) and silicone oil (e) into said hopper, and partially crosslinking the resulting mixture by dynamical heat treatment in the presence of organic peroxide.

In view of productivity of the desired thermoplastic elastomer compositions, the aforesaid retention time in the hopper of the mixture is desirably within 10 minutes, preferably within 5 minutes and especially preferably within 3 minutes.

That is, in the second process of the invention, a contact time of the mixture of (a) peroxide crosslinking type olefin copolymer rubber, (b) peroxide decomposition type olefin plastics and (c) peroxide non-crosslinking type hydrocarbon rubbery substance with (d) mineral oil type softener and (e) silicone oil in the hopper is within 10 minutes preferably within 5 minutes and especially preferably within 3 minutes.

The above-mentioned hopper of the extrusion machine may be partitioned in the inside thereof with a baffle or the like in order to avoid the contact of the above-mentioned mixture with the mineral oil type softener (d) as far as possible, or it may not be partitioned.

According to this second process of the invention, it has become possible to prepare thermoplastic elastomer compositions capable of providing therefrom molded articles which are low in hardness and excellent in soft touch, feelingness and cushioning properties by virtue of limiting the retention time in the hopper of extrusion machine of the above-mentioned mixture to within 10 minutes so that the mixture, the mineral oil type softener (d) and silicone oil (e) are fed smoothly into the cylinder of the extrusion machine.

In regard to the subject matter illustrated in the case of the first process for preparing thermoplastic elastomer compositions of the invention such as "organic peroxide", "dynamical heat treatment", "partially crosslinked thermoplastic elastomer compositions" and "various additives", the same is the case with the second process for preparing thermoplastic elastomer compositions of the invention, except the means of feeding the above-mentioned mixture, the mineral oil type softener (d) and silicone oil (e) into the cylinder of the extrusion machine.

EFFECT OF THE INVENTION

In accordance with the processes of the invention, there can be efficiently obtained thermoplastic elastomer compositions capable of providing therefrom molded articles which are low in hardness such as JIS A type hardness of not more than 50 and excellent in soft touch, feelingness and cushioning properties. The molded articles obtained from the thermoplastic elastomer compositions of the invention incorporated with silicone oil are low in hardness and excellent in soft touch, feelingness and cushioning properties without experiencing stickiness (tackiness), and are clean and dry to the touch.

The thermoplastic elastomer compositions obtained by the processes of the invention are widely used in composite materials where excellent soft touch, feelingness and cushioning properties are required, for example, a skin material for use in automotive trim materials which is prepared by two-color injection molding technique using, for example, a filler-incorporated polypropylene as a core and a thermoplastic elastomer as a surface of the skin material so that the filler incorporated polypropylene imparts mechanical strength to the skin material and the thermoplastic elastomer imparts low hardness, excellent soft touch, feelingness and cushioning properties to the surface of said skin material.

The present invention is illustrated below with reference to examples, but it should be construed that the invention is in no way limited to those examples.

First of all, molded articles composed of thermoplastic elastomer compositions and obtained by the following examples and comparative examples are evaluated with respect to their hardness, soft touch, feelingness and cushioning properties according to the following procedure.

EVALUATION

Press molding conditions under which a test pressed sheet is prepared:
Hot plate temperature: 190° C.
Clamp pressure 180 kg/cm$^2$G
Hot pressing time: 10 minutes
Cooling time: 5 minutes (cooling water)
(1) Hardness
A type spring hardness was measured in accordance with JIS K-6301.
(2) Soft touch
The touch felt by touching the surface of a molded article with hand was evaluated according to the following ratings.
5: Very soft
4: Soft
3: Ordinary
2: Hard
1: Very hard
(3) Feelingness
The feeling given by touching the surface of a molded article with hand was evaluated according to the following ratings.
5: Very clean and dry
4: Clean and dry
3: Ordinary
2: Tacky
1: Very tacky
(4) Cushioning properties
The feeling given by touching the surface of a molded article with hand was evaluated according to the following ratings.
a: Elastic
b: Ordinary
c: Not elastic

EXAMPLE 1

A mixture of 64 parts by weight of ethylene/propylene/ethylidenenorbornene copolymer rubber (ethylene repeating unit content 78 mol%, iodine value 13, Mooney viscosity [ML$_{1+4}$ (100° C.)] 75) oil-extended with 40 PHR of paraffinic process oil, 14 parts by weight of polypropylene (melt index (ASTM D 1238, 230° C.) 9, density 0.91 g cm$^3$, initial flexural modulus (ASTM D 790) 8,000 kg/cm$^2$) and 14 parts by weight of butyl rubber (Mooney viscosity [ML$_{1+4}$ (100° C.)] 45, degree of unsaturation 1.0 mol%) was kneaded by means of a Banbury mixer in a nitrogen atmosphere at 180° C. for 5 minutes. The kneaded product was then passed through a roll and cut by means of a sheet cutter into pellets.

Subsequently, the pellets were mixed by a tumbler blender with a solution of 0.4 part by weight of 1-3-bis(-tert-butylperoxyisopropyl)benzene in 0.4 part by weight of divinylbenzene to permit the solution to adhere uniformly to the surface of the pellets. The pellets thus treated were then fed through a hopper into a cylinder of an extrusion machine and extruded at 210° C. in a nitrogen atmosphere while feeding a paraffinic process oil and silicone oil (SH-200, a product of Toray Silicone K.K.) directly to a metering section of the cylinder using a plunger pump so that they amount to 19 parts by weight and 2 parts by weight, respectively, whereby a thermoplastic elastomer composition in the form of pellet was obtained.

The thermoplastic elastomer composition thus obtained was molded into an article which was then evaluated with respect to its soft touch, feelingness and cushioning properties.

Results obtained are shown in Table 1.

EXAMPLE 2

A thermoplastic elastomer composition was obtained by repeating the same procedure as in Example 1 except that naphthenic process oil was used in place of the paraffinic process oil. The same evaluation as in Example 1 was performed.

Results obtained are shown in Table 1.

EXAMPLE 3

A thermoplastic elastomer composition was obtained by repeating the same procedure as in Example 1 except that polypropylene having a melt index (ASTM D 1238, 230° C.) of 6, a density of 0.91 g/cm$^3$ and an initial flexural modulus (ASTM D 790) of 8200 kg/cm$^2$ was used in place of the polypropylene used in Example 1. The same evaluation as in Example 1 was performed.

Results obtained are shown in Table 1.

EXAMPLE 4

A thermoplastic elastomer composition was obtained by repeating the same procedure as in Example 1 except that the amount of the silicone oil used was changed to 4 parts by weight. The same evaluation as in Example 1 was performed.

Results obtained are shown in Table 1.

EXAMPLE 5

A thermoplastic elastomer composition was obtained by repeating the same procedure as in Example 1 except that the silicone oil was not used. The same evaluation as in Example 1 was performed.

Results obtained are shown in Table 1.

EXAMPLE 6

A thermoplastic elastomer composition was obtained by repeating the same procedure as in Example 1 except that in place of 19 parts by weight of the paraffinic process oil, 25 parts by weight of naphthenic process oil was used and the amount of the silicone oil used was changed to 4 parts by weight. The same evaluation as in Example 1 was performed.

Results obtained are shown in Table 1.

EXAMPLE 7

A thermoplastic elastomer composition was obtained by repeating the same procedure as in Example 3 except that the amount of the silicone oil used was changed to 4 parts by weight and naphthenic process oil was used in place of the paraffinic process oil. The same evaluation as in Example 3 was performed.

Results obtained are shown in Table 1.

COMPARATIVE EXAMPLE 1

A thermoplastic elastomer composition was intended to prepare by repeating the same procedure as in Example 1 except that instead of the direct feeding of 19 parts by weight of the paraffinic process oil to the metering section of the cylinder, 19 parts by weight of the paraffinic process oil was mixed by means of a Banbury mixer with the ethylene/propylene/ethylidenenorbornene copolymer rubber, polypropylene and butyl rubber of Example 1, followed by kneading and pelletizing. In that case, however, it was not possible to prepare the desired thermoplastic elastomer composition in a stabilized manner, because the mixture obtained by the above-mentioned kneading operation became sticky, and came to agglomerate when pelletized by means of the sheet cutter, whereby it became difficult to feed through the hopper into the cylinder of the extrusion machine.

TABLE 1

|  | \multicolumn{7}{c}{Example} |
|---|---|---|---|---|---|---|---|
|  | 1 | 2 | 3 | 4 | 5 | 6 | 7 |
| A type spring hardness (JIS K-6031) | 39 | 38 | 41 | 35 | 41 | 30 | 38 |
| Soft touch | 5 | 5 | 5 | 5 | 5 | 5 | 5 |
| Fellingness | 5 | 5 | 5 | 5 | 4 | 5 | 5 |
| Cushioning properties | a | a | a | a | a | a | a |

EXAMPLE 8

A mixture of 85 parts by weight of ethylene/propylene/ethylidenenorbornene copolymer rubber (ethylene repeating unit content 78 mol%, iodine value 13, Mooney viscosity [$ML_{1+4}$ (100° C.)] 75) oil-extended with 40 PHR of paraffinic process oil and 15 parts by weight of polypropylene (melt index (ASTM D 1238, 230° C.) 9, density 0.91 g/cm$^3$, initial flexural modulus (ASTM D 790) 8,000 kg/cm$^2$) was kneaded by means of a Banbury mixer in a nitrogen atmosphere at 180° C. for 5 minutes. The kneaded product was then passed through a roll and cut by means of a sheet cutter into pellets.

Subsequently, the pellets were mixed by a tumbler blender with a solution of 0.4 part by weight of 1,3-bis(tert-butylperoxyisopropyl)benzene in 0.4 part by weight of divinylbenzene to permit the solution to adhere uniformly to the surface of the pellets. The pellets thus treated were then fed through a hopper into a cylinder of an extrusion machine and extruded at 210° C. in a nitrogen atmosphere while feeding a paraffinic process oil and silicone oil (SH-200, a product of Toray Silicone K.K.) directly to a metering section of the cylinder using a plunger pump so that they amount to 22 parts by weight and 4 parts by weight, respectively, whereby a thermoplastic elastomer composition in the form of pellets was obtained.

The thermoplastic elastomer composition thus obtained was molded into an article which was then evaluated in the same manner as in Example 1.

Results obtained are shown in Table 2.

EXAMPLE 9

A thermoplastic elastomer composition was obtained by repeating the same procedure as in Example 8 except that 2 parts by weight of a paraffinic process oil was added to the mixture of the ethylene/propylene/ethylidenenorbornene copolymer rubber and polypropylene in a Banbury mixer, and the resulting mixture was kneaded in a nitrogen atmosphere at 180° C. for 5 minutes. The same evaluation as in Example 8 was then performed.

Results obtained are shown in Table 2.

EXAMPLE 10

A thermoplastic elastomer composition was obtained by repeating the same procedure as in Example 1 except that 2 parts by weight of a paraffinic process oil was added to the mixture of the ethylene/propylene/ethylidenenorbornene copolymer rubber and polypropylene in a Banbury mixer and the resulting mixture was kneaded in a nitrogen atmosphere at 180° C. for 5 minutes. The same evaluation as in Example 1 was then performed.

Results obtained are shown in Table 2.

EXAMPLE 11

A mixture of 64 parts by weight of ethylene/propylene/ethylidenenorbornene copolymer rubber (ethylene repeating unit content 78 mol%, iodine value 13, Mooney viscosity [$ML_{1+4}$ (100° C.)] 75) oil-extended with 40 PHR of paraffinic process oil, 14 parts by weight of polypropylene (melt index (ASTM D 1238, 230° C.) 9, density 0.91 g/cm$^3$, initial flexural modulus (ASTM D 790) 8,000 kg/cm$^2$) and 14 parts by weight of butyl rubber (Mooney viscosity [$ML_{1+4}$ (100° C.)] 45, degree of unsaturation 1.0 mol%) was kneaded by means of a Banbury mixer in a nitrogen atmosphere at 180° C. for 5 minutes. The kneaded product was then passed through a roll and cut by means of a sheet cutter into pellets.

Subsequently, the pellets were mixed by a tumbler blender with a solution of 0.4 parts by weight of 1,3-bis(tert-butylperoxyisopropyl)benzene in 0.4 part by weight of divinylbenzene to permit the solution to adhere uniformly to the surface of the pellets. The thus treated pellets were then fed through a hopper into a cylinder of an extrusion machine so that the retention time in the hopper of the pellets is within 5 seconds and extruded through the extrusion machine in a nitrogen atmosphere at 210° C. while feeding a paraffinic process oil and silicone oil (SH-200, a product of Toray Silicone K.K.) directly to the hopper using a plunger pump so that they amount to 19 parts by weight and 2 parts by weight, respectively, whereby a thermoplastic elastomer composition in the form of pellets was obtained.

The thermoplastic elastomer composition thus obtained was molded into an article which was then evaluated in the same manner as in Example 1.

Results obtained are shown in Table 2.

TABLE 2

|  | \multicolumn{4}{c}{Example} |
|---|---|---|---|---|
|  | 8 | 9 | 10 | 11 |
| A type spring hardness (JIS K-6031) | 47 | 45 | 37 | 39 |
| Soft touch | 5 | 5 | 5 | 5 |
| Fellingness | 5 | 5 | 5 | 5 |
| Cushioning properties | a | a | a | a |

What is claimed is:

1. A process for preparing partially crosslinked thermoplastic elastomer compositions, which comprises;
   feeding a mixture comprising (a) 90–40 parts by weight of peroxide crosslinking olefin copolymer rubber, (b) 10–60 parts by weight of peroxide decomposition olefin plastics (wherein (a) and (b) are selected so that (a)+(b) becomes 100 parts by weight), and (c) 0–100 parts by weight of peroxide non-crosslinking hydrocarbon rubbery substance through a hopper into a cylinder of an extrusion machine, feeding simultaneously (d) 10–80 parts by weight (based on 100 parts by weight of total sum of (a) and (b)) of a mineral oil softener, or (d) 10–80 parts by weight (based on 100 parts by weight of total sum of (a) and (b)) of a mineral oil softener and (e) 1–40 parts by weight (based on 100 parts by weight of total sum of (a) and (b)) of silicon oil through an inlet provided on the cylinder separately from the hopper into the cylinder, and dynamically heat treating the resulting mixture in the presence of organic peroxide in the cylinder, wherein the total amount of a mineral oil softener in the composition is increased by the feeding of (d) or of (d) and (e) through the inlet to such an amount to make the composition have a hardness of not more than 50 in terms of JIS A type spring hardness.

2. The process as claimed in claim 1 wherein the mixture contains a small amount of the mineral oil softener (d) and/or a small amount of the silicone oil (e).

3. A partially crosslinked thermoplastic elastomer composition having a hardness of not more than 50 in terms of JIS A type spring hardness and obtained by:

feeding a mixture containing (a) 90–40 parts by weight of peroxide crosslinking olefin copolymer rubber, (b) 10–60 parts by weight of peroxide decomposition olefin plastics (wherein (a) and (b) are selected so that (a)+(b) becomes 100 parts by weight), and (c) 0–100 parts by weight of peroxide noncrosslinking hydrocarbon rubbery substance through a hopper into a cylinder of an extrusion machine;

feeding simultaneously (d) 10–80 parts by weight (based on 100 parts by weight of total sum of (a) and (b)) of a mineral oil softener, or (d) 10–80 parts by weight (based on 100 parts by weight of total sum of (a) and (b)) of a mineral oil softener and (e) 1–40 parts by weight (based on 100 parts by weight of total sum of (a) and (b)) of silicone oil through an inlet provided on the cylinder separately from the hopper into the cylinder; and dynamically heat treating the resulting mixture in the presence of organic peroxide in the cylinder, wherein the total amount of a mineral oil softener is increased by the feeding of (d) or of (d) and (e) through the inlet to such an amount to make the composition have a hardness of not more than 50 in terms of JIS A type spring hardness.

4. A process for preparing partially crosslinked thermoplastic elastomer compositions, which comprises;

feeding a mixture comprising (a) 90–40 parts by weight of peroxide crosslinking olefin copolymer rubber, (b) 10–60 parts by weight of peroxide decomposition olefin plastics (wherein (a) and (b) are selected so that (a)+(b) becomes 100 parts by weight), and (c) 0–100 parts by weight of peroxide noncrosslinking hydrocarbon rubbery substance through a hopper into a cylinder of an extrusion machine so that the retention time in the hopper of the mixture is within 10 minutes;

feeding simultaneously (d) 10–80 parts by weight (based on 100 parts by weight of total sum of (a) and (b)) of a mineral oil softener, or (d) 10–80 parts by weight (based on 100 parts by weight of total sum of (a) and (b)) of a mineral oil softener and (e) 1–40 parts by weight (based on 100 parts by weight of total sum of (a) and (b)) of silicon oil through the hopper into the cylinder; and dynamically heat treating the resulting mixture in the presence of organic peroxide in the cylinder, wherein the total amount of a mineral oil softener in the composition is increased by the feeding of (d) or of (d) and (e) through the hopper to such an amount to make the composition have a hardness of not more than 50 in terms of JIS A type spring hardness.

5. The process as claimed in claim 4 wherein the mixture comprises a small amount of (d) a mineral oil softener and/or a small amount of (e) silicone oil.

6. A partially crosslinked thermoplastic elastomer composition having a hardness of not more than 50 in terms of JIS A type spring hardness and obtained by;

feeding a mixture comprising (a) 90–40 parts by weight of peroxide crosslinking olefin copolymer rubber, (b) 10–60 parts by weight of peroxide decomposition olefin plastics (wherein (a) and (b) are selected so that (a)+(b) becomes 100 parts by weight), and (c) 0–100 parts by weight of peroxide noncrosslinking hydrocarbon rubbery substance through a hopper into a cylinder of an extrusion machine so that the retention in the hopper of the mixture is within 10 minutes;

feeding simultaneously (d) 10–80 parts by weight (based on 100 parts by weight of total sum of (a) and (b)) of a mineral oil softener, or (d) 10–80 parts by weight (based on 100 parts by weight of total sum of (a) and (b)) of a mineral oil softener and (e) 1–40 parts by weight (based on 100 parts by weight of total sum of (a) and (b)) of silicone oil through an inlet provided on the cylinder separately from the hopper into the cylinder; and dynamically heat treating the resulting mixture in the presence of organic peroxide in the cylinder, wherein the total amount of a mineral oil softener in the composition is increased by the feeding of (d) or of (d) and (e) through the hopper to such an amount to make the composition have a hardness of not more than 50 in terms of JIS A type spring hardness.

7. The process according to claim 1 or 4 wherein the peroxide cross-linking olefin copolymer rubber is selected from the group consisting of ethylene/propylene/5-ethylidene-2-norbornene copolymer rubber and ethylene/propylene/5-ethylidene-2-norbornene/dicyclopentadiene quaternary polymer.

8. The process according to claim 1 or 4 wherein the peroxide cross-linking olefin copolymer rubber has a Mooney viscosity ($ML_{1+4}(100°\text{ C.})$) of 40–150.

9. The process according to claim 1 or 4 wherein the peroxide cross-linking olefin copolymer rubber has an iodine value of not more than 25.

10. The process according to claim 1 or 4 wherein the peroxide decomposition olefin plastic has a melt index (ASTM-D-1238-6ST, 230° C.) of 5-20.

11. The process according to claim 1 or 4 wherein the peroxide decomposition olefin plastic is polyisobutylene or butyl rubber.

12. The process according to claim 1 or 4 wherein the peroxide non-cross-linking hydrocarbon rubbery substance is present in an amount of 10-50 parts by weight based on the total sum of the amounts of components (a) and (b).

13. The process according to claim 12 wherein the peroxide non-cross-linking hydrocarbon rubbery substance has a Mooney viscosity ($ML_{1+4}(100°$ C.)) of not more than 60.

14. The process according to claim 13 wherein the mineral oil softener is a naphthenic mineral oil.

15. The process according to claim 1 or 4 wherein the mineral oil softener (d) is used in combination with the silicone oil (e).

16. The process according to claim 14 wherein the silicone oil is used in an amount of 1-40 parts by weight based on 100 parts by weight of the sum of components (a) and (b).

17. The process according to claim 15 wherein the silicone oil is selected from the group consisting of dimethyl silicone oil and phenylmethyl silicone oil.

18. The process according to claim 1 further comprising the addition of a decomposition accelerating agent to the mixture of (a), (b) and (c).

19. The process according to claim 4 wherein the mixture is retained in the hopper for up to 3 minutes.

20. The process of claim 4 wherein the mixture of (a), (b) and (c) and the mineral oil softener (d) or mixture of (d) and silicon oil (e) are simultaneously fed into said hopper under conditions whereby the mixture and mineral oil softener or mineral oil softener and silicon oil do not contact each other in said hopper.

* * * * *